(12) United States Patent
Chung et al.

(10) Patent No.: US 10,754,150 B2
(45) Date of Patent: Aug. 25, 2020

(54) ELECTRONIC DEVICE INCLUDING FLEXIBLE DISPLAY

(71) Applicant: Samsung Electronics Co., Ltd., Suwon-si, Gyeonggi-do (KR)

(72) Inventors: Hyunwoong Chung, Yongin-si (KR); Sangyong Eom, Suwon-si (KR); Sungho Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/332,109

(22) PCT Filed: Sep. 12, 2017

(86) PCT No.: PCT/LR2017/009986
§ 371 (c)(1),
(2) Date: Mar. 11, 2019

(87) PCT Pub. No.: WO2018/052231
PCT Pub. Date: Mar. 22, 2018

(65) Prior Publication Data
US 2019/0361230 A1 Nov. 28, 2019

(30) Foreign Application Priority Data
Sep. 13, 2016 (KR) .......... 10-2016-0118295

(51) Int. Cl.
*G06F 1/16* (2006.01)
*G02B 27/00* (2006.01)
*H04N 13/332* (2018.01)

(52) U.S. Cl.
CPC ......... *G02B 27/0081* (2013.01); *G06F 1/163* (2013.01); *G06F 1/1652* (2013.01); *G06F 1/1681* (2013.01); *H04N 13/332* (2018.05)

(58) Field of Classification Search
CPC ....................................................... G06F 1/163
USPC ....................................................... 361/679.03
See application file for complete search history.

(56) References Cited

U.S. PATENT DOCUMENTS

| | | | |
|---|---|---|---|
| 6,529,331 B2 * | 3/2003 | Massof | G02B 27/017 345/9 |
| 9,454,010 B1 * | 9/2016 | Passmore | G02B 3/0087 |
| 9,864,201 B2 | 1/2018 | Kim et al. | |
| 10,353,202 B2 * | 7/2019 | Tervo | G02B 6/0076 |
| 10,437,047 B2 * | 10/2019 | Chiu | G02B 26/0875 |
| 2006/0017654 A1 * | 1/2006 | Romo | G06F 3/01 345/7 |
| 2008/0049389 A1 | 2/2008 | Kim | |

(Continued)

FOREIGN PATENT DOCUMENTS

| | | |
|---|---|---|
| KR | 10-2005-0114432 A | 12/2005 |
| KR | 10-2014-0025121 A | 3/2014 |

(Continued)

*Primary Examiner* — Anthony Q Edwards
(74) *Attorney, Agent, or Firm* — Jefferson IP Law, LLP

(57) ABSTRACT

According to various embodiments, an electronic device can comprise: a housing including a first surface oriented in a first direction, and a second surface oriented in a second direction traversing the first direction; a display, which is arranged along at least a part of the first surface and at least a part of the second surface and has at least a portion including a curved surface; and an optical unit arranged along the first direction.

13 Claims, 13 Drawing Sheets

(56) References Cited

U.S. PATENT DOCUMENTS

| | | | |
|---|---|---|---|
| 2008/0106489 A1* | 5/2008 | Brown | G02B 27/0172 345/9 |
| 2014/0266990 A1* | 9/2014 | Makino | G02B 27/017 345/8 |
| 2015/0062707 A1* | 3/2015 | Simmonds | G02B 27/0172 359/567 |
| 2015/0219902 A1 | 8/2015 | Kim et al. | |
| 2015/0346494 A1* | 12/2015 | Tanaka | G02B 27/017 345/647 |
| 2016/0165218 A1 | 6/2016 | Seo et al. | |
| 2017/0176755 A1* | 6/2017 | Cai | G02B 5/1842 |
| 2017/0212669 A1* | 7/2017 | Kim | G06F 3/011 |
| 2018/0239151 A1* | 8/2018 | Chang | G02B 27/0176 |
| 2019/0266798 A1* | 8/2019 | Ngai | G06F 3/011 |

FOREIGN PATENT DOCUMENTS

| | | |
|---|---|---|
| KR | 10-2015-0093054 A | 8/2015 |
| KR | 10-2016-0006049 A | 1/2016 |
| KR | 10-2016-0068060 A | 6/2016 |

\* cited by examiner

ELECTRONIC DEVICE INCLUDING FLEXIBLE DISPLAY

TECHNICAL FIELD

Various embodiments of the disclosure relate to an electronic device including a flexible display.

BACKGROUND ART

As information and communication technology and semiconductor technology have developed, various electronic devices have been increasingly distributed and used. In particular, there has recently been an increasing demand for virtual reality (VR) electronic devices that provide a specific environment or situation and make a user feel as if he or she is interacting with the actual surrounding situation and environment. Such a virtual reality electronic device may also reproduce a multimedia content such as a movie or drama.

DISCLOSURE OF INVENTION

Technical Problem

The field of view (FOV) of a human is about 200 degrees, but the FOV of a flat display applied to the existing virtual reality electronic device is smaller than 200 degrees (110 degrees), which may cause the user's immersion feeling to be lowered. The FOV of the screen displayed on a virtual reality electronic device does not coincide with the human FOV, which may cause motion sickness. In addition, when a fisheye lens is used to enlarge the FOV of a screen, pixels on a side portion of the flat display may be greatly enlarged to cause an image degradation problem (a Screen Door Effect (SDE)).

Solution to Problem

An electronic device according to various embodiments may include: a housing including a first face oriented in a first direction and a second face oriented in a second direction intersecting the first direction; a display disposed along at least a part of the first face and at least a part of the second face, at least a part of the display including a curved face; and an optical module disposed in the first direction.

Advantageous Effects of Invention

The electronic device according to various embodiments uses a flexible display including a curved surface to secure an FOV of 200 degrees similar to the human FOV. Thus, it is possible to provide an immersion feeling as if the user is in a real environment and to improve usability. In various embodiments, it is possible to secure a screen FOV corresponding to the human FOV, thereby reducing the likelihood of causing motion sickness of the user. In various embodiments, it is possible to enhance the image quality on the side portions of the display. The electronic device according to various embodiments includes a flexible display, so that a set size can be reduced and the flexibility of design implementation can be improved.

BEST MODE FOR CARRYING OUT THE INVENTION

Figure 1:
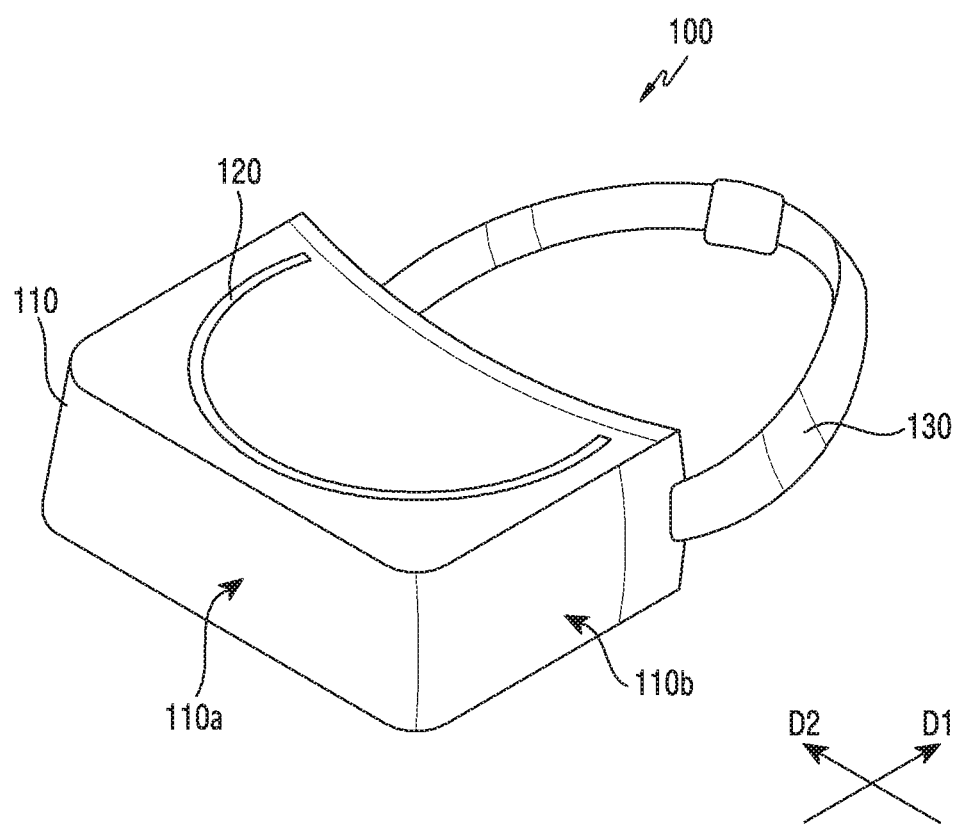
FIG. 1 is a perspective view illustrating an electronic device according to various embodiments.

Hereinafter, various embodiments of the present invention will be described with reference to accompanying drawings. However, various embodiments of the present invention are not limited to specific embodiments, and it should be understood that modification, equivalent, and/or alternative on the various embodiments described herein can be variously made. With regard to description of drawings, similar components may be marked by similar reference numerals.

In the disclosure disclosed herein, the expressions "have," "may have," "include" and "comprise," or "may include" and "may comprise" used herein indicate existence of corresponding features (for example, elements such as numeric values, functions, operations, or components) and do not preclude the presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein, may refer to various elements of various embodiments of the present invention, but do not limit the elements. For example, such terms do not limit the order and/or priority of the elements. Furthermore, such terms may be used to distinguish one element from another element. For example, "a first user device" and "a second user device" indicate different user devices regardless of the order or priority. For example, without departing from the scope of the present invention, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to another element or coupled with/to or connected to another element via an intervening element (for example, a third element). In contrast, when an element (for example, a first element) is referred to as being "directly coupled with/to" or "directly connected to" another element (for example, a second element), it should be understood that there is no intervening element (for example, a third element).

According to the situation, the expression "configured to (or set to)" used herein may be used as, for example, the expression "suitable for," "having the capacity to," "designed to," "adapted to," "made to," or "capable of". The term "configured to (or set to)" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in the present invention are used to describe specified embodiments of the present invention and are not intended to limit the scope of other embodiments. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way, unless expressly so defined herein in various embodiments of the present invention. In some cases, even if terms are terms which are defined in the specification, they may not be interpreted to exclude embodiments of the present invention.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (for example, smart glasses, head-mounted-devices (HMDs), electronic apparels, electronic bracelets, electronic necklaces, electronic appcessory, electronic tattoos, smart mirrors, or smart watches).

Hereinafter, various embodiments of the disclosure will be described in detail with reference to the accompanying drawings.

FIG. 1 is a perspective view illustrating an electronic device according to various embodiments.

According to various embodiments, an electronic device 100 may include a housing 110, a display 120, and a wearing unit 130, as illustrated in FIG. 1.

According to various embodiments, the housing 110 may form the appearance of the electronic device 100. The housing 110 may be a support (support structure) made of an injection material forming the exterior design of the electronic device 100. The housing 110 may include a first face 110a oriented in a first direction D1 and a second face 110b oriented in a second direction D2 that intersects the first direction D2. For example, the first face 110a may be the front face of the housing 110 and the second face 110b may be the side face of the housing 110. The housing 110 may accommodate the components of the electronic device 100, such as the display 120, an optical module (not illustrated). The housing 110 may support any one face of the display 120. For example, the housing 110 may support the rear face of the display 120.

According to various embodiments, the display 120 may be a flexible display, which is deformable. At least one face of the display 120 may include a curved face. The display 120 may be accommodated in the housing 110. The display 120 may be a component of the electronic device 100. The display 120 may be configured in the inside of the electronic device 100 in a stand-alone or tethered manner.

According to various embodiments, the display 120 may be seated on an outer face of the housing 110. The display 120 may be a component of an external electronic device mounted on the electronic device 100. The display 120 may be provided from an external electronic device (not illustrated). For example, the display 120 may be a display included in an external electronic device detachably mounted on the electronic device 100 (e.g., a smartphone, a tablet Personal Computer (PC), a navigation device, a mobile phone, a videophone, or an E-book reader). The external electronic device may be mounted in the electronic device 100 in a drop-in manner.

According to various embodiments, the display device 120 may include, for example, a Liquid Crystal Display (LCD), a Light-Emitting Diode (LED) display, an Organic Light-Emitting Diode (OLED) display, a MicroElectroMechanical System (MEMS), or an electronic paper display. The display 120 may display various contents (e.g., a text, an image, a video image, an icon, or a symbol) to, for example, the user. The display 120 may provide a virtual reality through the screen.

According to various embodiments, the display 120 may be a transparent display capable of transmitting external light. The display 120 may display various contents associated with the actual external environment while transmitting the actual external environment. The display 120 may provide an augmented reality capable of interacting with the external environment.

According to various embodiments, the display 120 may include a touch screen, and may receive a touch input, a gesture input, a proximity input, or a hovering input that is made using, for example, an electronic pen or a part of the user's body.

According to various embodiments, one face of the display 120 may be disposed along at least a portion of the first face 110a and the second face 110b of the housing 110. A face of the display 120 may be disposed to face at least a part of the first face 110a and the second face 110b of the housing 110. For example, the rear face of the display 120 may be disposed along at least a part of the first face 110a and the second face 110b of the housing 110. For example, the rear face of the display 120 may be disposed along at least a part of the front and side faces of the housing 110. The rear face of the display 120 may be disposed to face at least a part of the front and side faces of the housing 110.

According to various embodiments, the display may include a plurality of sub-displays. The plurality of sub-displays may be disposed along at least a part of the first face 110a and the second face 110b of the housing 110. The sub-displays may display the same image or different images.

According to various embodiments, the wearing unit 130 may be connected to the housing 110. The wearing unit 130 may be configured to be wearable on the user's body. The wearing unit 130 may be configured in a band type. The wearing unit 130 may be worn on the user's head. According to various embodiments, the wearing unit 130 may be constituted with eyeglass temples. When the wearing unit 130 is constituted with eyeglass temples, the wearing unit 130 may be worn on the user's ears.

FIGS. 2A, 2B, 2C, and 2D are exploded perspective views each illustrating an electronic device according to various embodiments.

Figure 2A:
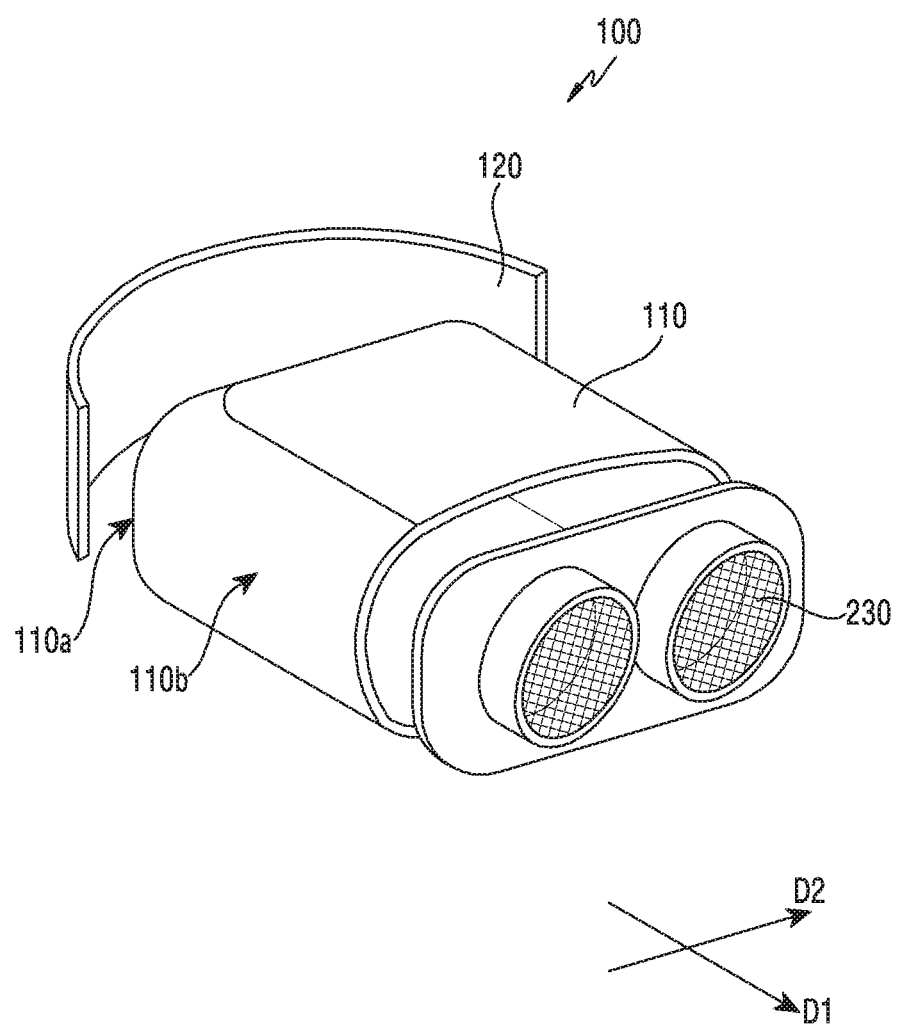
FIGS. 2A, 2B, 2C, and 2D are exploded perspective views each illustrating an electronic device according to various embodiments.

The electronic device 100 according to various embodiments may include a housing 110, a display 120, and an optical module 230, as illustrated in FIG. 2A. The display 120 and the optical module 230 may be accommodated in the housing 110. The display 120 may be a bent shape that is deformable. The display 120 may be bendable. Alternatively, the display 120 may be of a curved type.

According to various embodiments, the optical module 230 may be disposed in a first direction D1. The optical module 230 may be disposed between the display 120 and the user's eyes to adjust an image perceived by the user. The optical module 230 may include a Fresnel-type lens. For example, the optical module 230 may include a pair of fish-eye lenses. The optical module 230 may include an ultra-wide-angle lens having a wide FOV of 180 degrees or more. The optical module 230 may include lenses in which multifocal lenses are grafted onto fisheye lenses.

Figure 2B:
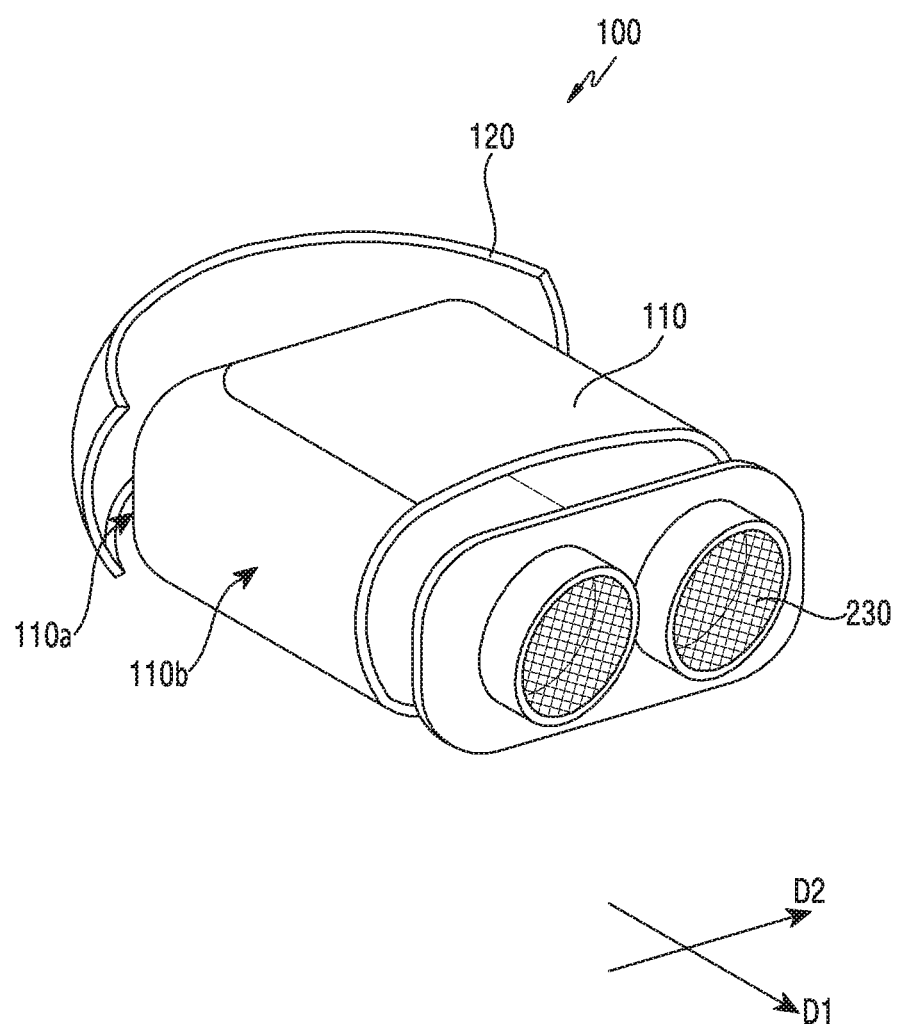

The electronic device 100 according to various embodiments may include a housing 110, a display 120, and an optical module 230, as illustrated in FIG. 2B. The display 120 may be of a dome type. For example, the display 120 may have a shape in which the edges of the display 120 are bent.

Figure 2C:
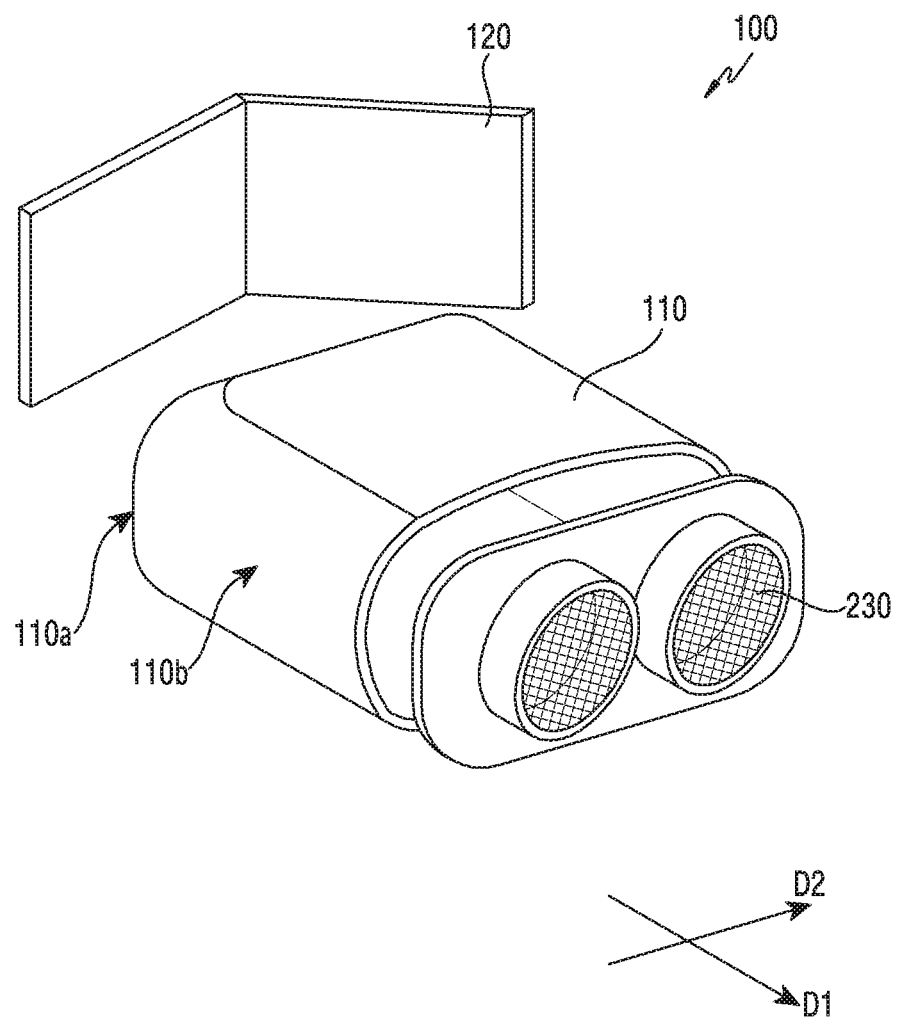

The electronic device 100 according to various embodiments may include a housing 110, a display 120, and an optical module 230, as illustrated in FIG. 2C. The display 120 may have a shape obtained by folding a planar display at an angle. By folding the display 120 at various angles, it is possible to secure an FOV of a screen in the level of 200 degrees similar to the human FOV.

Figure 2D:
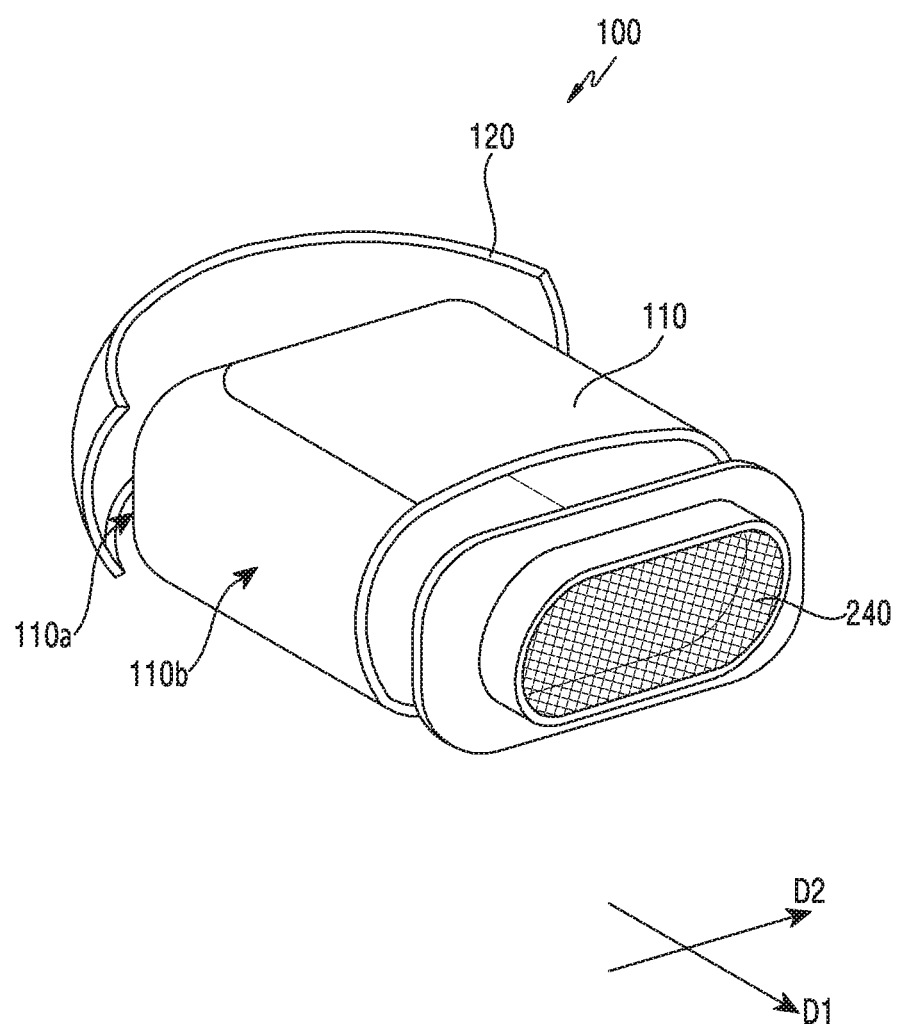

The electronic device 100 according to various embodiments may include a housing 110, a display 120, and an optical module 230, as illustrated in FIG. 2D. The optical module 240 may include a goggle-type lens.

Figure 3A:
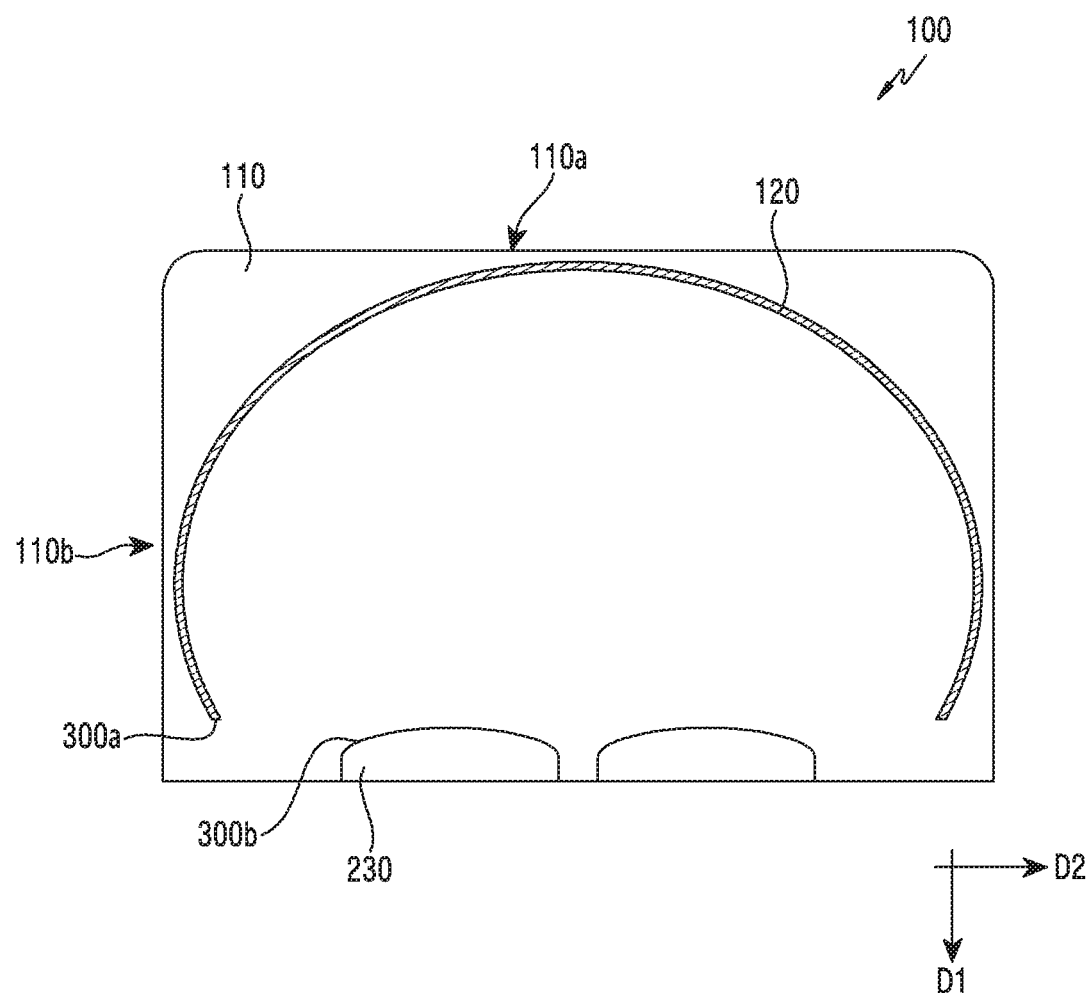
FIGS. 3A, 3B, and 3C are plan views each illustrating an electronic device according to various embodiments.
Figure 3B:
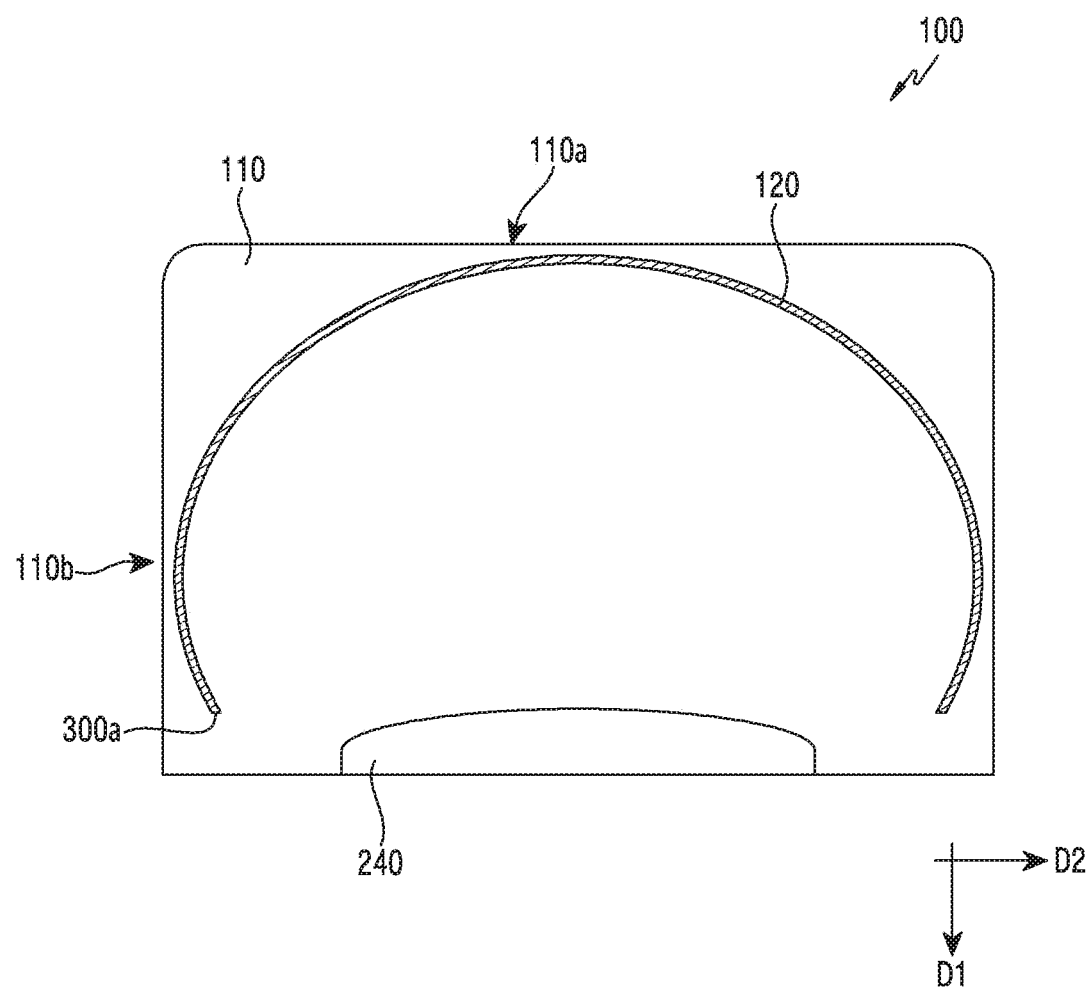
Figure 3C:
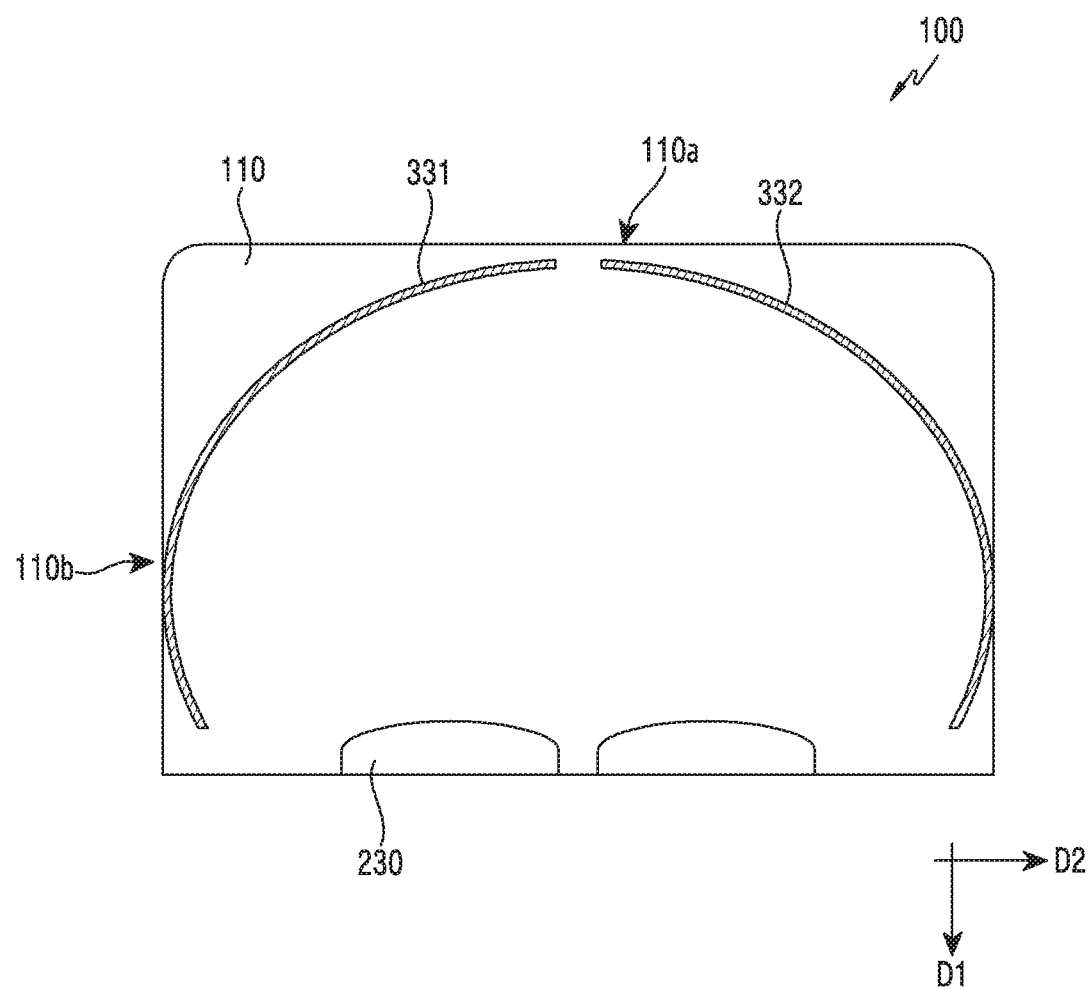

FIGS. 3A, 3B, and 3C are plan views each illustrating an electronic device according to various embodiments.

According to various embodiments, as illustrated in FIG. 3A, at least one face of the display 120 may be disposed along the first face 110a and the second face 110b of the housing. One end 300a of the display 120 may be disposed on the same line as one end 300b of the optical module 230 disposed close to the user's eyes. However, the embodiment is not limited thereto, and one end 300a of the display 120 may be disposed adjacent to one end 300b of the optical module 230. In various embodiments, at least one face of the display 120 is disposed along the second face 110b, so that the FOV set in the display 120 can be enlarged. The FOV set in the display 120 may be between 110 degrees and 200 degrees. In various embodiments, the FOV set in the display 120 may be enlarged through the design of the optical module 230. For example, the FOV set in the display 120 may be adjusted through the design of the curvature radius, the lens shape, the refractive index, the focal length, the number of lenses, the lens thickness, the lens arrangement, the lens spacing, or the like of the optical module 230. According to various embodiments, as illustrated in FIG. 3B, the optical module 240 may include a goggle-type lens.

According to various embodiments, as illustrated in FIG. 3C, the electronic device 100 may include a first display 331 and a second display 332. At least one face of the first display 331 and the second display 331 may be disposed along the first face 110a and the second face 110b of the housing. As illustrated in FIG. 3B, the electronic device 100 may include a first display 331 and a second display 332 that are physically separated from each other, the embodiment is not limited thereto. In various embodiments, displayed regions displayed may be distinguished in a single display.

Figure 4:
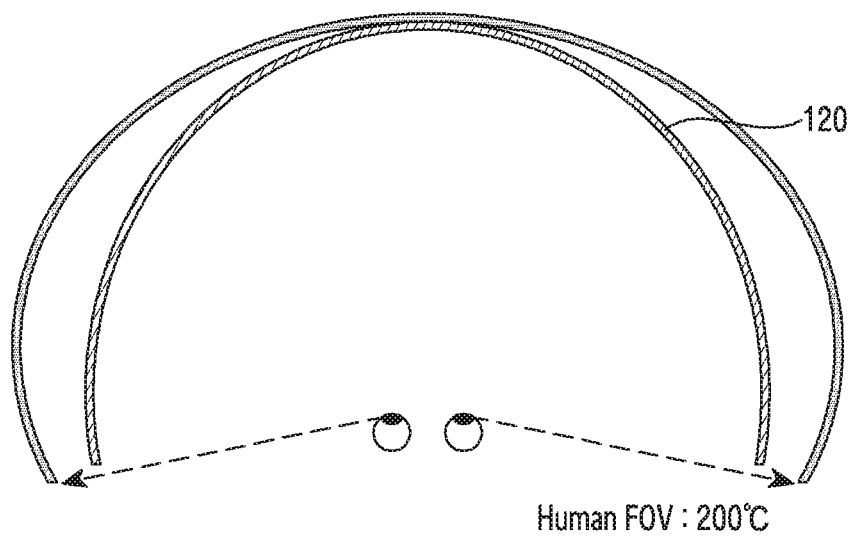
FIG. 4 is a view for explaining enlargement of FOV of an electronic device according to various embodiments.

FIG. 4 is a view for explaining enlargement of an FOV of an electronic device according to various embodiments.

As illustrated in FIG. 4, the human FOV is about 200 degrees. According to various embodiments, the electronic device 100 is capable of securing a screen FOV corresponding to the human FOV through the display 120. For example, the electronic device 100 is capable of securing the FOV of about 200 degrees through the display 120. The electronic device 100 according to various embodiments may enhance the sensation of reality by enlarging the screen FOV to the human FOV through the display 120, thereby reducing the likelihood of causing motion sickness of the user. In addition, it is possible to enhance image quality by improving the image on the side faces of the display 120.

Figure 5:
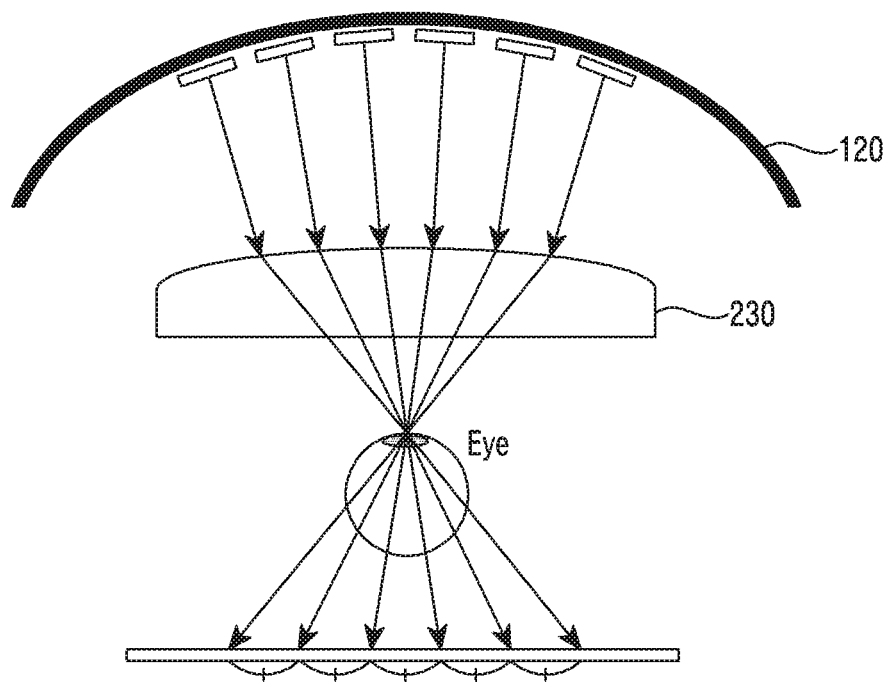
FIG. 5 is a view for explaining image enhancement of an electronic device according to various embodiments.

FIG. 5 is a view for explaining image enhancement of an electronic device according to various embodiments.

As illustrated in FIG. 5, when light emitted from the display 120 is incident on the user's eyes through the optical module 230, the focal lengths of the images formed on the user's eyes may correspond to each other. For example, the focal lengths may be the same as or similar to each other. In various embodiments, differences in image clarity depending on a position at which the screen is displayed on the display 120 may be reduced. For example, it is possible to ensure the sharpness of an image displayed on one side face of the display 120.

Figure 6:
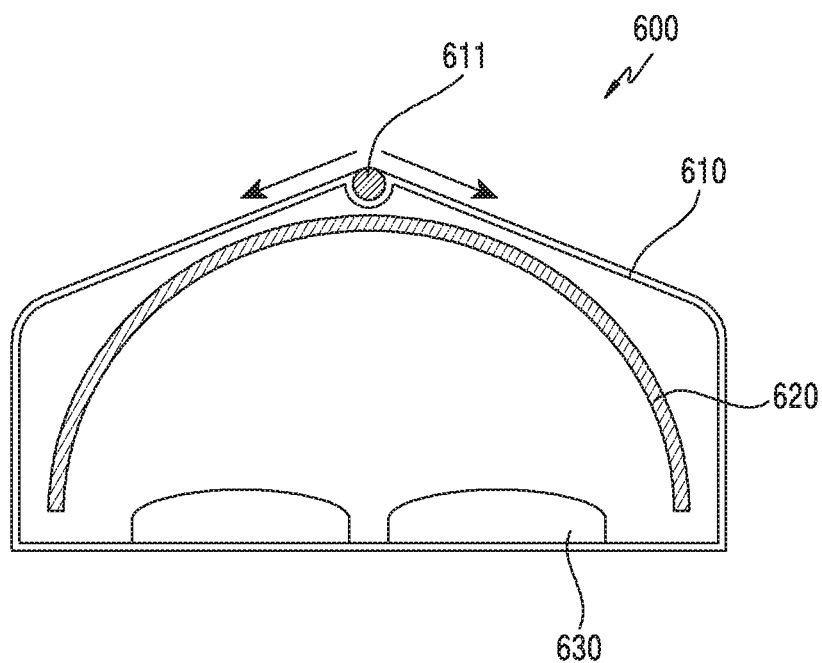
FIG. 6 is a plan view illustrating an electronic device according to various embodiments.

FIG. 6 is a plan view illustrating an electronic device according to various embodiments.

As illustrated in FIG. 6, the electronic device 600 according to various embodiments may include a hinge structure 611. For example, the electronic device 600 may be configured such that the housing 610 is rotatable in a specific direction through the hinge structure 611 of the housing 610. The display 620 seated on the housing 610 may be bent at various angles according to the rotation of the housing 610. In various embodiments, the curvature of the display 620 or the center position of the curved face of the display 620 may be changed according to the rotation of the housing 610. In various embodiments, it is possible to provide a suitable screen according to the shape of the user's eyes by bending the display 620. Meanwhile, although FIG. 6 illustrates that the optical module 630 includes a pair of lenses, but the embodiment is not limited thereto. Accordingly, the optical module 630 may include a goggle-type lens described above.

Figure 7:
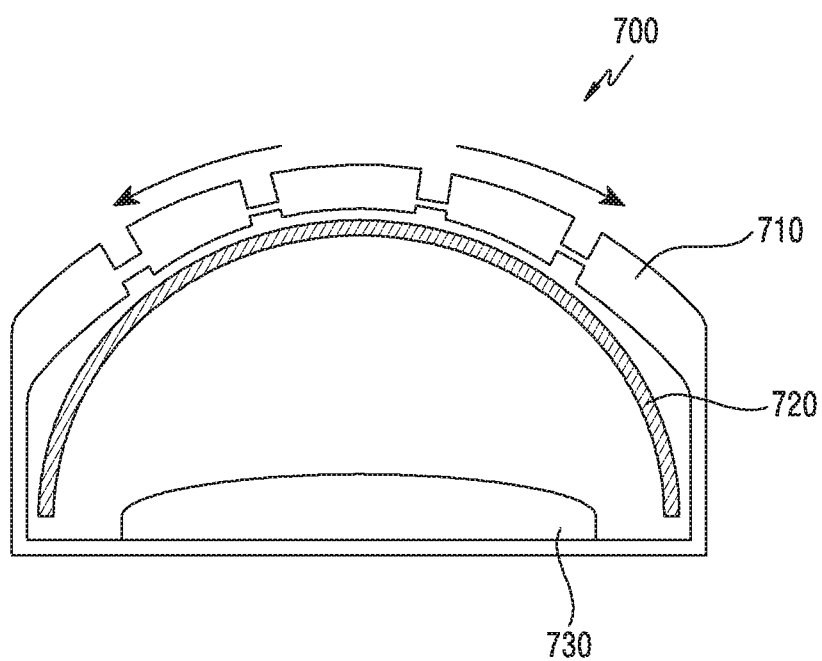
FIG. 7 is a plan view illustrating an electronic device according to various embodiments.

FIG. 7 is a plan view illustrating an electronic device according to various embodiments.

As illustrated in FIG. 7, the electronic device 700 according to various embodiments may include a multi joint structure. For example, the electronic device 700 may be configured such that the housing 710 is rotatable in a specific direction through the multi joint structure of the housing 710. The display 720 seated on the housing 610 may be bent at various angles according to the rotation of the housing 710. In various embodiments, the curvature of the display 720 or the center position of the curved face of the display 720 may be changed according to the rotation of the housing 710. In various embodiments, it is possible to provide a suitable screen according to the shape of the user's eyes by bending the display 720.

In addition, although not illustrated in the drawings, according to various embodiments, the housing 710 of the electronic device 700 may include a shape change material that is changed in shape. The shape change material may be formed of at least one of, for example, piezoelectric material, a shape memory alloy, a shape memory polymer, an electroactive polymer, or an electromechanical actuator (e.g., a rotary motor, a linear motor, a mechanical actuator or a pneumatic actuator). The shape change material may be changed in shape by, for example, an electronic signal, such as Direct-Current (DC) voltage, Alternating-Current (AC) voltage, biased AC (e.g., AC-DC coupling, or pulsed DC (e.g., pulsed width modulation)), optics (e.g., ultraviolet rays), heat (e.g., temperature), water pressure, atmospheric pressure, or the like.

Meanwhile, although FIG. 7 illustrates that the optical module 630 includes a goggle-type lens, but the embodiment is not limited thereto. Accordingly, the optical module 630 may include a pair of fish-eye lenses described above.

Figure 8:
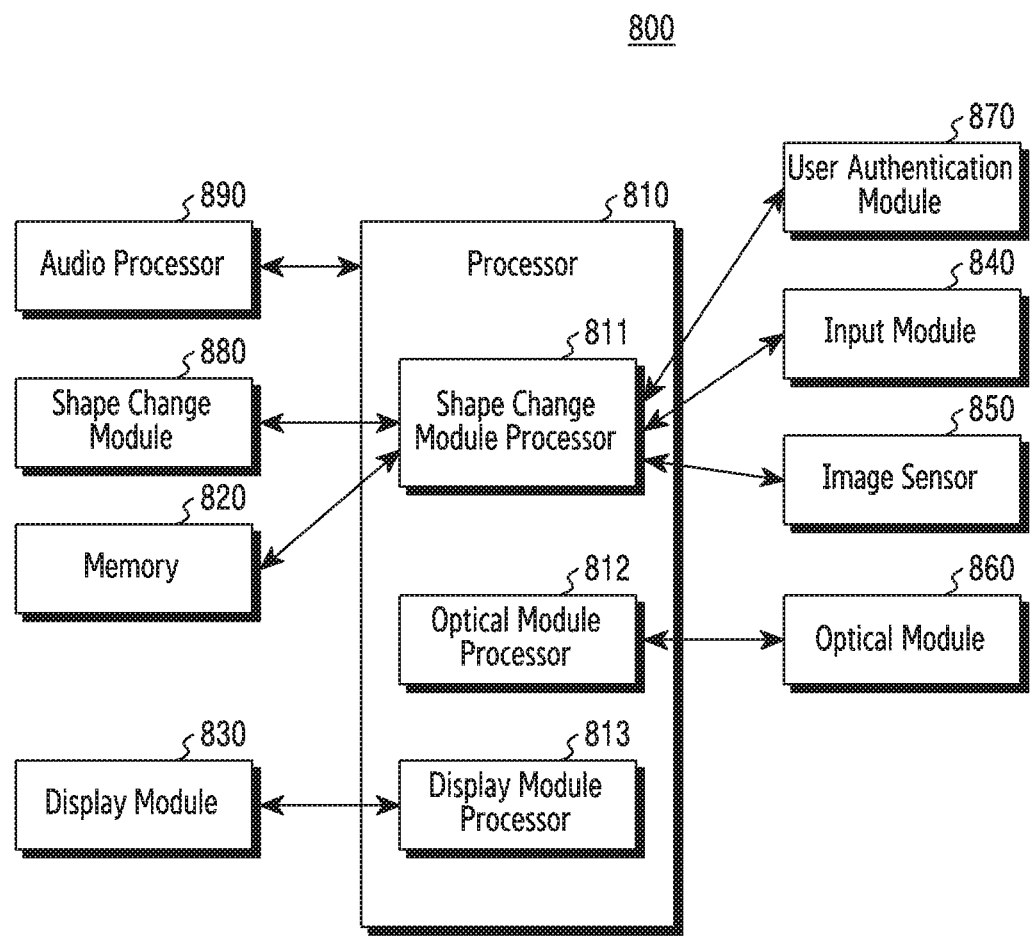
FIG. 8 is a block diagram of an electronic device according to various embodiments.

FIG. 8 is a block diagram of an electronic device according to various embodiments.

As illustrated in FIG. 8, an electronic device 800 according to various embodiments may include a processor 810, a memory 820, a display 830, an input interface 840, an image sensor 850, an optical module 860, a user authentication module 870, a shape change module 880, or an audio processor 890. The processor 810 may include a shape change module processor 811, an optical module processor 812, and a display module processor 813.

According to various embodiments, the audio processor 890 may include a speaker SPK configured to output a received audio signal, an audio signal associated with an audio file stored in a memory 820, or a microphone MIC configured to detect a user's voice or other audio signals. The audio processor 890 according to various embodiments of the disclosure is capable of outputting various sound effects according to the operation of the electronic device 800 through the speaker SPK. In addition, according to an embodiment, the audio processor 890 is capable of acquiring an audio signal for controlling a shape change module 880 through the microphone MIC when a shape change mode is activated (ON or enabled). For example, when an audio signal indicating "movement to the left" is input through the microphone MIC, the audio processor 890 may transmit a signal corresponding to the movement to the left to the shape change module 880. In this case, the shape change module 880 is movable to the left under the control of the processor 810.

According to various embodiments, the shape change module 880 is capable of changing the shape of the display module 830. For example, the shape change module 880 is capable of changing the curvature of the display module 830 or the center position of the curved surface of the display module 830. The shape change module 880 is capable of changing the shape of the display module 830 manually or automatically. The shape change module 880 may be located at least a portion of the electronic device 800. For example, the shape change module 880 may be located in at least one of the top, bottom, left, right, front, and rear portions of the display module 830 of the electronic device 800. The shape change module 880 may be located in at least a part of the housing that houses the display module 830. The shape change module 880 may be implemented through a hinge of a housing or a housing having a multi joint structure.

According to various embodiments, the shape change module 880 may change the shape of the display module 830 on the basis of the user's eye information. For example, the shape change module 880 may change the shape of the display module 830 depending on one of the user's eye information acquired through the image sensor 850, the user's request to change the shape of the display module 830, the user's authentication information, or setting information specified for the user.

According to various embodiments, the shape change module 880 may change the position of the display module 830. The shape change module 880 may change the distance between the display module 830 and the optical module 860.

According to various embodiments, the user authentication module 870 is capable of authenticating the user. For example, the user authentication module 870 may include a biometric sensor (e.g., a fingerprint recognition sensor or an iris recognition sensor). For example, when the wear of the electronic device 800 is detected, the user authentication module 870 is capable of recognizing biometric information such as iris or fingerprint of the wearer and authenticating the user using the biometric information. Alternatively, the user authentication module 870 is capable of authenticating the user through identification information such as an ID or a password input by the user using the input device. When the authentication is completed, the user authentication module 870 may transmit the information of the authenticated user to the processor 810 (e.g., the shape change module processor 811). According to an embodiment, the user authentication module 870 is capable of authenticating the user through a combination of the above-described methods or a method corresponding thereto.

According to various embodiments, the optical module 860 may adjust (magnify or reduce) and/or correct an image (e.g., an image or a video image) displayed on the display module 830. The optical module 860 may include one or more lenses. The optical module 860 may be controlled under the control of the optical module processor 812. According to various embodiments, the refractive index of the optical module 860 may be changed depending on the change in curvature of the display module 830. In this case, it is possible to correct an image distortion caused due to the change in the curvature of the display module 830. The optical module 860 may be formed in, for example, an electro-active lenticular form. The optical module 860 may be implemented through various designs of a radius of curvature, a lens shape, a refractive index, a focal length, the number of lenses, a lens thickness, an arrangement of lenses, the spacing between lenses, and the like. The optical portion 860 may include one or more fish-eye lenses. The optical module 860 may include an ultra-wide-angle lens having a wide FOV of 180 degrees or more. The optical module 860 may include a multifocal lens. The optical module 860 may include a lens in which a multifocal lens is grafted onto a fisheye lens.

According to various embodiments, the input module 840 may receive numeric or textual information input from, for example, the user for the electronic device 800. The input module 840 may include, for example, a plurality of input keys or function keys for setting various functions. The function key mays include, for example, a direction key, a side key, or a shortcut key set to perform a specific function. In addition, the input module 840 may generate a signal associated with the user's setting or function control of the electronic device 800, and may transmit the signal to the processor 810. The input module 840 may be constituted with at least one of a ball joystick, an optical joystick, a wheel key, a touch key, a touch pad, or a touch screen, or a combination thereof. The input module 840 according to an embodiment of the disclosure may acquire an input signal for turning on/off a shape change mode for changing the shape of the display module 830, an input signal for controlling a shape change module 880 (e.g., positional movement), an input signal for inputting authentication information for user authentication, or the like, and may transmit the obtained input signal to the processor 810.

According to various embodiments, the image sensor 850 is a device for imaging a subject, and the image sensor 850 may convert, for example, an image obtained by imaging the subject into an electrical signal and store the converted electrical signal as digital data. For example, the image sensor 850 may be implemented with a Charge-Coupled Device (CCD) image sensor, a Complementary Metal Oxide Semiconductor (CMOS) image sensor, or the like. For example, the image sensor 850 may be a camera module. The image sensor 850 may support a function of recognizing the user's eyes (e.g., a sight line or a distance between eyes). For example, the electronic device 800 according to an embodiment of the disclosure may acquire the user's sight line information for the electronic device 800 through the image sensor 850, and may measure the distance between the user's eyes or the position of the eyes on the basis of the acquired user's sight line information.

According to various embodiments, the display module 830 may display, for example, information input by the user or information to be provided to the user, in addition to various menus of the electronic device 800. For example, the display module 830 may provide various screens according to the use of the electronic device 800, such as a menu screen, a web page screen, and a call screen. The display module 830 may be a flexible display that is deformable. The display module 830 may have at least one of a bent shape, a curved shape, or a dome shape. The display module 830 may be changed in shape by the shape change module 880. For example, the curvature or the position of the center of the curved face of the display module 830 may be changed.

According to various embodiments, the display module 830 may be a component of an external electronic device mounted on the electronic device 800. The display module 830 may be provided from an external electronic device (not illustrated). For example, the display module 830 may be a display included in an external electronic device that is detachable from the electronic device 800.

According to various embodiments, the memory 820 may store, for example, an operating system (OS) of the electronic device 800, and applications required for other option functions such as a sound playback function, an image or video image playback function, an Internet access function, a text messaging function, and a map service function. In addition, the memory 820 may store various data such as video image data, game data, music data, movie data, and map data.

According to various embodiments, the memory 820 may include setting information corresponding to the type of the display module to be used for controlling the form of the display module for each user. For example, the memory 820 may store setting information of the shape change module 880 corresponding to the shape of the display module 830. For example, the setting information may include the curvature of the display module 830 and the distance between and the user's two eyes (e.g., the distance between the centers of two curved surfaces of the display module 830). The curvature information may include, for example, the transverse length of a curved portion.

According to various embodiments, the memory 820 may store authentication information or setting information for authenticating a user when the electronic device 800 is used by a plurality of users. For example, the authentication information may be biometric information (e.g., iris information and fingerprint information). Alternatively, the authentication information may be a user's ID and password.

According to various embodiments, the memory 820 may store information related to a shape change module control program that controls the shape change module 880. The shape change module control program may include an instruction for controlling the shape change module 880 in response to the user's operation or an instruction for controlling the shape change module 880 to recognize the user's eyes and to change the shape of the display module 830 depending on the recognized eyes. Alternatively, the shape change module control program may include an instruction for controlling the shape change module 880 to authenticate the user and to change the shape of the display module 830 to correspond to the authenticated user.

According to various embodiments, the memory 820 may store information related to an optical module control program that controls the shape of the optical module 860. The optical module control program may control the shape of the optical module 860 depending on the shape change of the display module 830. For example, when the image is distorted due to a change in the curvature of the display module 830, the optical module control program may correct the distortion by adjusting the refractive index of the optical module 860.

According to various embodiments, the processor 810 may control the of the external electronic device 920 may perform functions of controlling the overall operations of the electronic device 800 and a signal flow between the internal blocks of the electronic device 800, and may perform a data processing function for processing data. For example, the processor 810 may be constituted with a Central Processing Unit (CPU), an application processor, or the like. The processor 810 may be constituted with, for example, a single core processor or a multi-core processor.

According to various embodiments, the processor 810 may include at least one of a shape change module processor 811, an optical module processor 812, and a display module processor 813. The processor 810 may control the shape change operation of the display module 830, or the shape change operation or the image display operation of the optical module 860.

The shape change module processor 811 may control the shape change module 880 to control the shape change of the display module 830. For example, the shape change module processor 811 may control the shape change module 880 through a user input through a button, a touch pad, a touch screen, or the like, voice recognition through the microphone MIC, or the like.

According to various embodiments, the shape change module processor 811 may recognize the user's eyes (e.g., the center distance between the eyes), and may control the shape change module 880 depending on the recognition result. For example, the shape change module processor 811 may control the shape change module 880 to match the distance between the recognized eyes and the distance between the centers of two curved faces of the display module 830. Alternatively, the shape change module processor 811 controls the shape change module 880 to adjust the shape change module 480 such that the center between the recognized eyes and the center of the curved face of the display module 830 is located on a straight line.

According to various embodiments, upon detecting whether or not the user wears the electronic device 800, the shape change module processor 811 may control the shape change module 880 with reference to the setting information (e.g., information previously set by the user). Alternatively, the shape change module processor 811 may control the shape change module 880 by referring to the setting information. For example, when the user is authenticated through the user authentication module 870, the shape change module processor 811 may retrieve setting information related to the user authenticated from the setting information (e.g., setting information), and may control the shape change module 880 with reference to the retrieved setting information.

According to various embodiments, the optical module processor 812 may change the shape of the optical module 860 on the basis of the shape change of the display module 830. For example, the optical module processor 812 may move the optical module 860 to the left or right. When the optical module 860 is constituted with a device capable of changing the curvature like an active lenticular form, the optical module processor 812 may adjust the refractive index of the optical module 860 in order to correct distortion of an image caused due to the change in curvature of the display module 830. Alternatively, when the optical module 860 includes a plurality of lenses, the optical module processor 812 may correct the image by adjusting the arrangement or spacing of the lenses.

According to various embodiments, the display module processor 813 may control an output position of a picture (e.g., an image or a video image). For example, when the shape of the display module 830 is changed, the display module processor 813 may control the position of the area providing the image such that the center of the image can be provided at the center of the convex portion of the display module 830. In addition, the display module processor 813 may correct and output the image such that the image is not distorted depending on the curvature of the display module 830.

In the above description, it has been described that the shape change module 880 is controlled by the processor 810 (e.g., the shape change module processor 811). However, the embodiment of the disclosure is not limited thereto. For example, the shape change module 880 may include a control function. In this case, the shape change module processor 811 may be omitted.

Although not illustrated in FIG. 8, the electronic device 800 may selectively further include components having additional functions, such as a broadcast reception module configured to receive broadcasts, a sensor module including a plurality of sensors (such as a motion sensor, an illuminance sensor, an acceleration sensor, and a geomagnetic sensor), and a digital sound source playback module such as an MP3 module. Although it is impossible to enumerate such components since the components are very diversely modified according to the convergence trend of digital devices, the electronic device 800 according to an embodiment of the disclosure may include components equivalent to the above-mentioned components.

An electronic device according to various embodiments may include: a housing including a first face oriented in a first direction and a second face oriented in a second direction intersecting the first direction; a display disposed along at least a part of the first face and at least a part of the second face, at least a part of the display including a curved face; and an optical module disposed in the first direction.

In the electronic device according to various embodiments, any one face of the display may be disposed to face at least a part of the first face and at least a part of the second face.

In the electronic device according to various embodiments, the display may be configured such that a curvature of the curved face is changed.

In the electronic device according to various embodiments, the display may include a bent shape that is fixed or is deformable.

In the electronic device according to various embodiments, the display may include a dome shape.

In the electronic device according to various embodiments, a field of view set in the display may correspond to a field of view of a human.

In the electronic device according to various embodiments, one end of the display may correspond to one end of the optical module.

In the electronic device according to various embodiments, the optical module may include a pair of lenses or a single goggle-type lens.

In the electronic device according to various embodiments, the optical module may include a fish-eye lens.

In the electronic device according to various embodiments, the optical module may include a wide-angle lens.

In the electronic device according to various embodiments, the optical module may include a multifocal lens.

In the electronic device according to various embodiments, the optical module may be configured such that a spacing between the display and the optical module or a curvature of the optical module is changed depending on a change of a curvature of the display.

In the electronic device according to various embodiments, the housing may include a hinge.

In the electronic device according to various embodiments, the housing may include a multi joint structure.

In the electronic device according to various embodiments, a curvature of the curved face of the display may be changed depending on a deformation of the housing.

Meanwhile, the exemplary embodiments disclosed in the specification and drawings are merely presented to easily describe the technical contents of the disclosure and help with the understanding of the disclosure and are not intended to limit the scope of the disclosure. Therefore, all changes or modifications derived from the technical idea of the disclosure as well as the embodiments described herein should be interpreted to belong to the scope of the disclosure.

The invention claimed is:

1. An electronic device comprising:
    a housing including a first face oriented in a first direction and a second face oriented in a second direction intersecting the first direction;
    a display disposed along at least a part of the first face and at least a part of the second face, at least a part of the display including a curved face; and
    an optical module disposed in the first direction,
    wherein a curvature of the curved face of the display is changed depending on a deformation of the housing.

2. The electronic device of claim 1, wherein any one face of the display is disposed to face at least a part of the first face and at least a part of the second face.

3. The electronic device of claim 1, wherein the display is configured such that a curvature of the curved face is fixed or changed.

4. The electronic device of claim 1, wherein the display includes a bent shape that is fixed or is deformable.

5. The electronic device of claim 1, wherein the display includes a dome shape.

6. The electronic device of claim 1, wherein a field of view set in the display corresponds to a field of view of a human.

7. The electronic device of claim 1, wherein one end of the display corresponds to one end of the optical module.

8. The electronic device of claim 1, wherein the optical module includes a pair of lenses or a single goggle-type lens.

9. The electronic device of claim 1, wherein the optical module includes a fish-eye lens or a wide-angle lens.

10. The electronic device of claim 1, wherein the optical module includes a multifocal lens.

11. The electronic device of claim 1, wherein the optical module is configured such that a spacing between the display and the optical module or a curvature of the optical module is changed depending on a change of a curvature of the display.

12. The electronic device of claim 1, wherein the housing includes a hinge.

13. The electronic device of claim 1, wherein the housing includes a multi-joint structure.

\* \* \* \* \*